United States Patent
Kennedy

(10) Patent No.: US 9,829,618 B2
(45) Date of Patent: Nov. 28, 2017

(54) LED LIGHTING FIXTURE WITH A LIGHT EMITTING WAVEGUIDE RESEMBLING A LAMP SHADE

(71) Applicant: Matthew Kennedy, Chilliwack (CA)

(72) Inventor: Matthew Kennedy, Chilliwack (CA)

(73) Assignee: LOOM INC., Chilliwack, BC (CA)

( * ) Notice: Subject to any disclaimer, the term of this patent is extended or adjusted under 35 U.S.C. 154(b) by 0 days.

(21) Appl. No.: 15/120,148

(22) PCT Filed: Jan. 22, 2015

(86) PCT No.: PCT/CA2015/050044
§ 371 (c)(1),
(2) Date: Aug. 19, 2016

(87) PCT Pub. No.: WO2015/127550
PCT Pub. Date: Sep. 3, 2015

(65) Prior Publication Data
US 2017/0068033 A1    Mar. 9, 2017

(30) Foreign Application Priority Data
Feb. 25, 2014  (CA) ..................................... 2843575

(51) Int. Cl.
*F21V 3/00* (2015.01)
*F21V 8/00* (2006.01)
(Continued)

(52) U.S. Cl.
CPC ............ *G02B 6/0001* (2013.01); *F21S 6/005* (2013.01); *F21V 1/00* (2013.01); *F21V 1/146* (2013.01);
(Continued)

(58) Field of Classification Search
CPC .......... F21S 6/005; F21V 17/10; F21V 19/00; F21V 21/00; F21V 21/003; F21V 23/00; F21V 1/00; F21V 1/146; F21Y 2115/10
See application file for complete search history.

(56) References Cited

U.S. PATENT DOCUMENTS 6,787,990 B2 * 9/2004 Cok .................... H01R 12/7076
                                                        313/499
2005/0111228 A1    5/2005 Chen
(Continued)

FOREIGN PATENT DOCUMENTS

CA    2451748 A1    6/2005
CA    2829388 A1    9/2012
(Continued)

OTHER PUBLICATIONS

International Search Report issued in corresponding PCT application No. PCT/CA2015/050044 dated Apr. 23, 2015.
(Continued)

*Primary Examiner* — Ali Alavi
(74) *Attorney, Agent, or Firm* — Davis & Bujold PLLC; Michael J. Bujold

(57) ABSTRACT

A lighting waveguide and its assembly in an LED lighting fixture. LED waveguide technology offers a novel approach to the design of a lighting fixture that still retains a typical appearance of a lamp shade and lighting fixture. A nominally transparent plastic or glass waveguide is fashioned into the shape of a lamp shade with a slot at one side that defines a gap between two edges or ends of the waveguide, and possess perturbations on the surface of the waveguide to facilitate the extraction and provide usable light from the lighting fixture. An LED PCB board, with side-mounted LEDs, is mounted to the lighting fixture between the slot in the waveguide such that the light emitting surfaces of the LEDs are proximal to and face towards the edges of the waveguide, Illuminating the waveguide and providing light from the light fixture via the perturbations that provide a light extraction.

8 Claims, 9 Drawing Sheets

(51) Int. Cl.
      *F21S 6/00*     (2006.01)
      *F21V 1/14*     (2006.01)
      *F21V 1/00*     (2006.01)
      *F21V 17/10*    (2006.01)
      *F21V 19/00*    (2006.01)
      *F21V 23/00*    (2015.01)
      *F21Y 115/10*   (2016.01)

(52) U.S. Cl.
      CPC ............ *F21V 17/10* (2013.01); *F21V 19/003* (2013.01); *F21V 23/001* (2013.01); *F21V 2200/20* (2015.01); *F21Y 2115/10* (2016.08)

(56) References Cited

U.S. PATENT DOCUMENTS

| | | |
|---|---|---|
| 2011/0267821 A1 | 11/2011 | Van De Ven et al. |
| 2014/0056028 A1 | 2/2014 | Nichol et al. |

FOREIGN PATENT DOCUMENTS

| | | |
|---|---|---|
| EP | 2554899 A2 | 2/2013 |
| WO | 2010069159 A1 | 6/2010 |
| WO | 2011100193 A1 | 8/2011 |

OTHER PUBLICATIONS

Written Opinion issued in corresponding PCT application No. PCT/CA2015/050044 dated Apr. 23, 2015.

* cited by examiner

LED LIGHTING FIXTURE WITH A LIGHT EMITTING WAVEGUIDE RESEMBLING A LAMP SHADE

This application is a national stage completion of PCT/CA2015/050044 filed Jan. 22, 2015 which claims priority from Canadian Application No. 2,843,575 filed Feb. 25, 2014.

BACKGROUND OF THE INVENTION

Waveguide technology, otherwise known as edge-lit, light pipe, light guide or fiber optic light transmission is a mature technology with many applications in use such as providing light along long distances by way of a fiber optic cable, illuminating a back-lit advertisement by means of an edge-lit panel behind the advertisement, or providing illumination as a lighting fixture. In use as a lighting fixture, or luminaire, light is directed into the end of a nominally transparent object that comprises the waveguide, generally in the form of a panel or rod, and is typically comprised of plastic or glass. Due to the phenomenon described as total internal reflection, or TIR, light is able to bounce within the confines of the waveguide since the angle of incidence of the light approaching an interior surface of the waveguide prevents the light from escaping, as it bounces off the interior surface of the waveguide back into the body of the waveguide, where it continues to do so as it travels the length of the waveguide; by this means does light travel the extent of the waveguide, such that it guides light waves within itself.

The major surface or surfaces of the waveguide are nominally glossy and transparent in order to maintain this effect, however in order to extract the light from the waveguides, portions of the surface where light is desirably extracted from require perturbations that disrupt the travel of light from TIR and instead allow the light to pass through the interior surface of the waveguide and exit as light. These perturbations may come in many forms such as surface frosting, spot facing, etching, crazing, or any other irregularity on the surface of the waveguide that may be produced by a molding process, acid etching, silk-screening, chemical reaction or mechanical process and the like.

Light-emitting diode, or LED, light sources lend themselves to transmitting light through a waveguide as their relatively small width works well in conjunction with the normally small thickness of the waveguide, the LED width typically being a little smaller than the waveguide and, in typical terms, the LED being approximately 2 mm wide and the waveguide being anywhere from 3 to 6 mm wide, though these figures may vary by design. LEDs are typically mounted to a printed circuit board, or PCB.

SUMMARY OF THE INVENTION

The invention is the design and method of assembly of a light extracting waveguide lighting fixture. The waveguide component of the lighting fixture is a nominally transparent plastic or glass cylinder or cone with a slot down one side such that the waveguide is comprised of two major surfaces, a top and bottom edge, and two edges facing each other with a gap between them. Edges as described in this application may refer to the small faces or ends of the waveguide, and are generally flat is disposition, though alternative designs can exist such as possessing a profiled shape to provide an enhanced capture of light into the waveguide. The relatively large radius of the cylinder or cone shape of the waveguide relative to the direction and wavelength of light enables TIR to function effectively to transmit light throughout the waveguide. Perturbation on the major surface of the waveguide enable light to extract from the waveguide, providing usable illumination.

When assembled to the light fixture supporting frame, supporting an LED PCB, the emitting surfaces of the LEDs face into and are proximal to the facing edges of the waveguide at either end of the slot, such that the LEDs on the PCB are considered to be between the edges within the slot. The LEDs in the preferred embodiment are side mounted, such that the major surface of the PCB the LEDs are mounted to is vertically disposed in line with the slot and theoretically tangent to the curve of the waveguide, the side mounted LEDs then are facing perpendicularly sideways from the PCB in two rows facing either edge of the waveguide at either end of the slot. Two rows of LEDs facing in opposite directions and illuminating opposing slot edges of the waveguide maximize the amount of light entering the waveguide from a single PCB. A conductor, generally in the form of a cable connector, is mounted to the PCB at a position accessible to a channel within the support frame, whereby a power cable can be brought into the lighting fixture and connected to the PCB, providing power to the LEDs.

This waveguide is fixed to the light fixture by way of fastening means, which in the preferred embodiment is an anteriorly proud flange or bead running the length of the waveguide from the bottom to top adjacent to the slot and facing edge, on either side of the slot, therefore two beads. Grooves on the supporting frame of the light fixture match the beads on the waveguide and, when assembled, the beads mate within said grooves, retaining the waveguide to the supporting frame. This prevents the waveguide from siding out of the light fixture when in use. A break in the bead and corresponding flange on the support or support from the bottom of the waveguide provide means to prevent the waveguide falling downwards. Alternatively, the groove may be in the waveguide, and the bead on the support.

The waveguide is held in position by fastening means which, in the preferred embodiment, is comprised of hardware that passes through an interior mounting plate that fixes to the support frame, holding the waveguide to the PCB and mounting the PCB against the support frame. In turn, the support frame is supported by supporting means, in the form of a lamp stand base, or suspension system and the like.

The preferred embodiment of the waveguide of the invention is injection molded acrylic, nominally 3 to 5 mm thick, which lends itself to the manufacture the simple form, the relative thickness of the material, the glossy surface with minor perturbations, UV stability, and the molded-in bead used as retention means, in addition to the high production rate of the waveguide's manufacture.

Alternatively, components of the assembly may be retained by adhesive tape or other alternative assembly means,

DESCRIPTION OF THE PREFERRED EMBODIMENT

Figure 1:
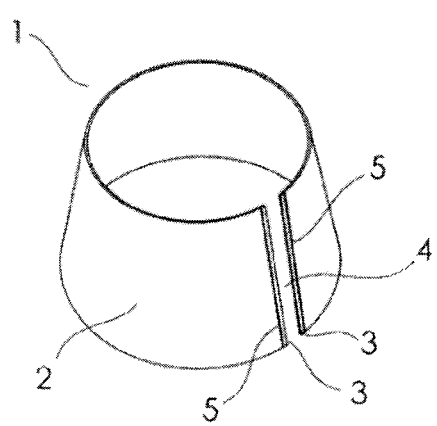
FIG. 1 is a perspective view of the preferred embodiment of the waveguide of the invention.
Figure 2:
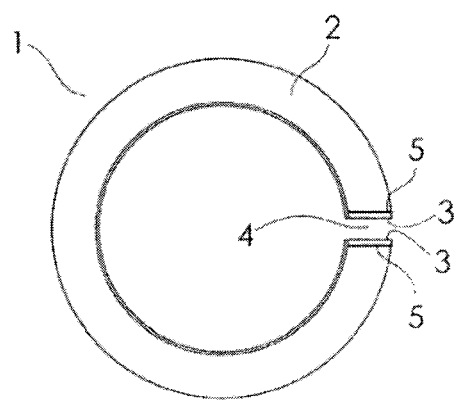
FIG. 2 is a top plan view of the preferred embodiment of the waveguide of the invention.
Figure 3:
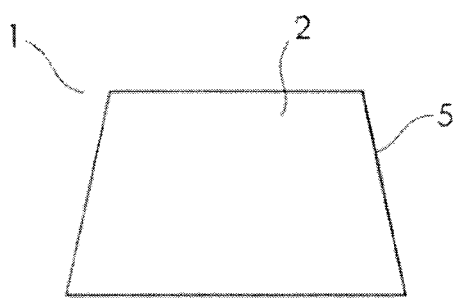
FIG. 3 is a side plan view of the preferred embodiment of the waveguide of the invention.
Figure 4:
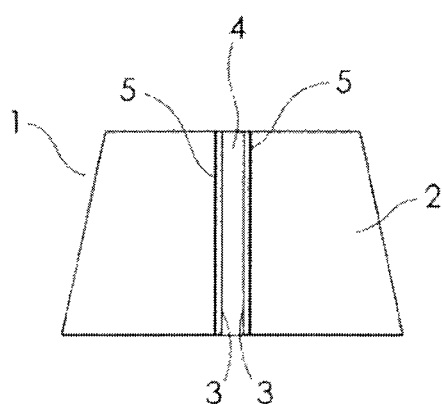
FIG. 4 is a front plan view of the preferred embodiment of the waveguide of the invention.

FIGS. 1 through 4 depict the waveguide 1 of the invention, showing the major exterior surface 2, the slot 3 on one side of the waveguide, waveguide edges 4 on either side of the slot, and assembly beads 5 on either side of said slot.

Figure 5:
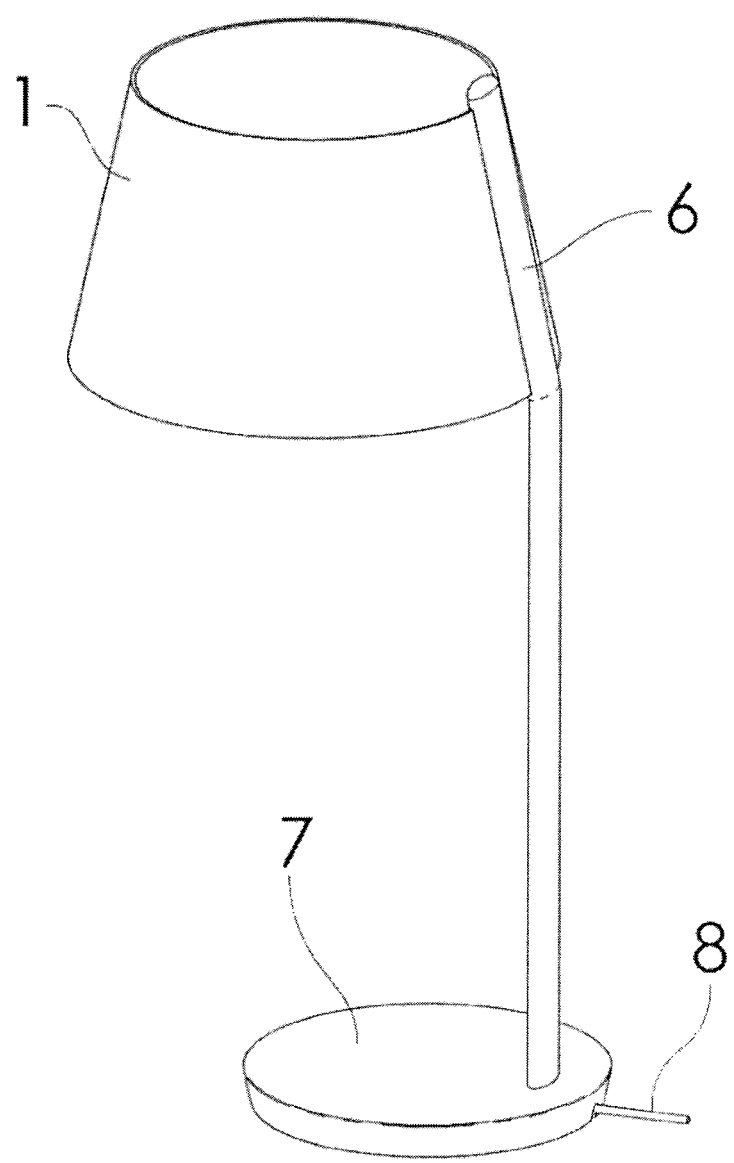
FIG. 5 is a perspective view of the preferred embodiment of the waveguide of the invention in assembly with a supporting frame and support means.
Figure 6:
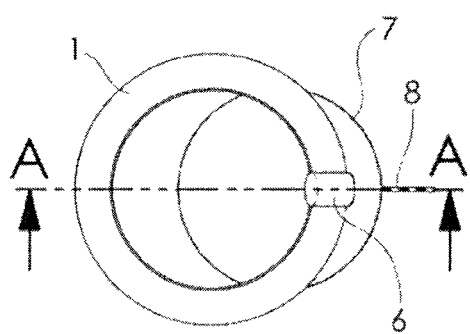
FIG. 6 is a top plan view of the preferred embodiment of the waveguide of the invention in assembly with a supporting frame showing the section line pertaining to FIG. 7.

FIGS. 5 and 6 depict the invention as a lighting fixture with a waveguide 1 mounted within a support frame 6, supported by support means in the form of a lamp stand base 7 and powered by a power means in the form of a cable 8.

Figure 7:
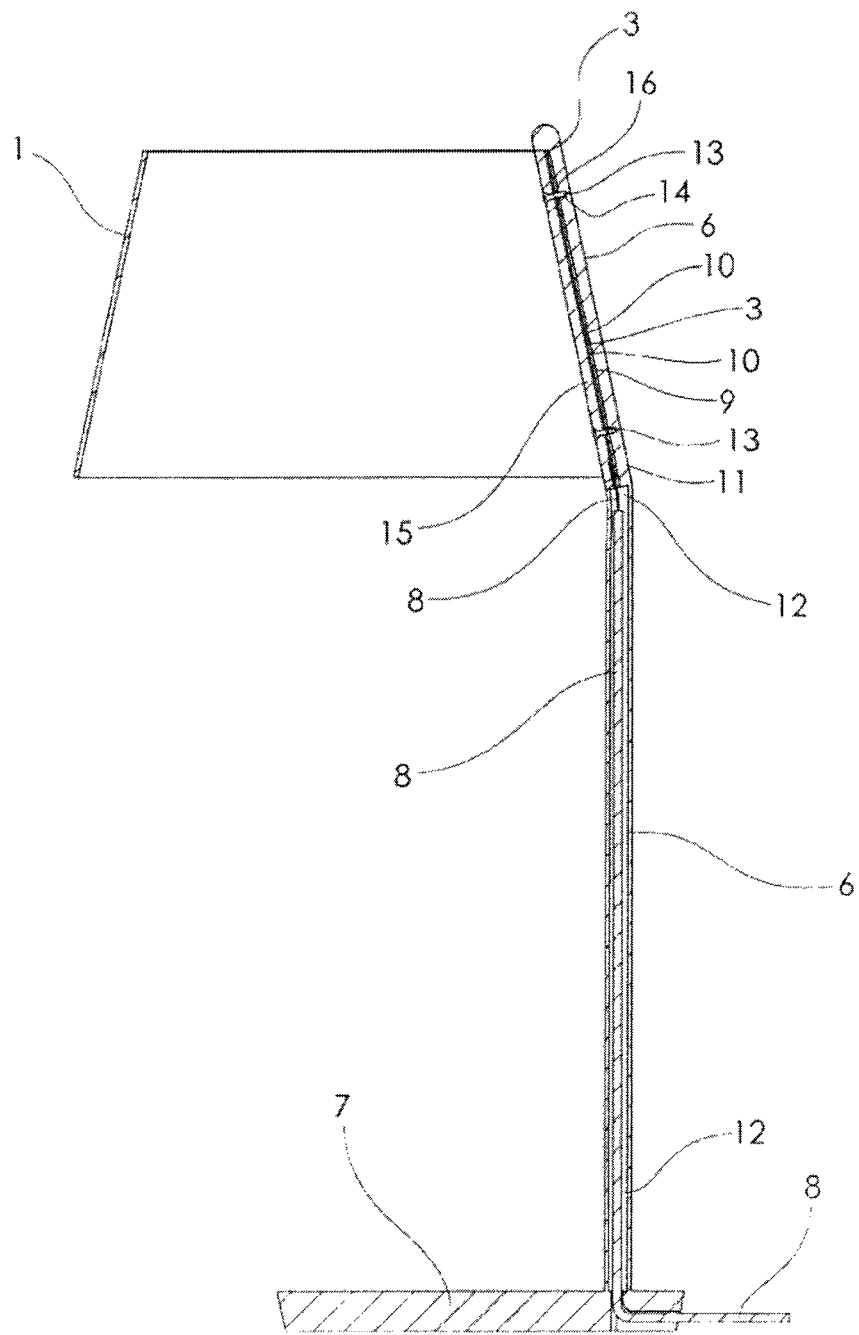
FIG. 7 is a plan section view of the preferred embodiment of the invention in assembly showing details of the waveguide, support frame, power source, support means, and features of the LED PCB, including LEDs, conductors, and assembly and mounting means.

FIG. 7 is a cross-sectional side plan view of the invention depicting the waveguide assembled to and supported by the support frame 6 by fastening means in the form of hardware 13 into threaded holes 14 in support frame 6 that vise a mounting bracket 15 against the waveguide 1 to the support frame 6, whereby an LED PCB 9 is held captive between the support frame 6 and the waveguide 1, hardware 13 passing through mounting holes 16 in the PCB, the LEDs 10 of said PCB 9 captive between the slot 4 of the waveguide 1 whose emitting surfaces are proximally adjacent to and point towards the edges 3 of said waveguide 1. A conductor 11, in the form of a power connector, mounted to the PCB board 9 provides power to the LEDs 10 via said PCB 9 when a power source 8, in the form of a power cable within a channel 12 within support frame 6 is connected to the conductor 11.

Figure 8:
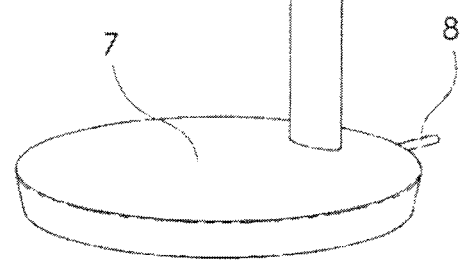
FIG. 8 is a perspective view of the assembly without the waveguide, mounting plate or hardware, revealing the position of the LEDs and PCB within the assembly, in addition to the channel retaining the power source, and grooves to retain the waveguide.

FIG. 8 depicts the support frame 6 of the invention supported by the support means 7 and in turn supporting the LED PCB 9, the power provided by power means 8 in the form of a cable and wires connecting to a conductor 11 on the PCB 9 in the form of a power connector, providing power to the LEDs 10 via said PCB 9. Grooves 18 in the support frame 6 match the pronounced beads 5 as seen in FIG. 1, such that when the waveguide 1 is mounted to said support frame 6, said beads 5 and grooves 18 mate such that the waveguide is physically retained in the light fixture at assembly.

Figure 9:
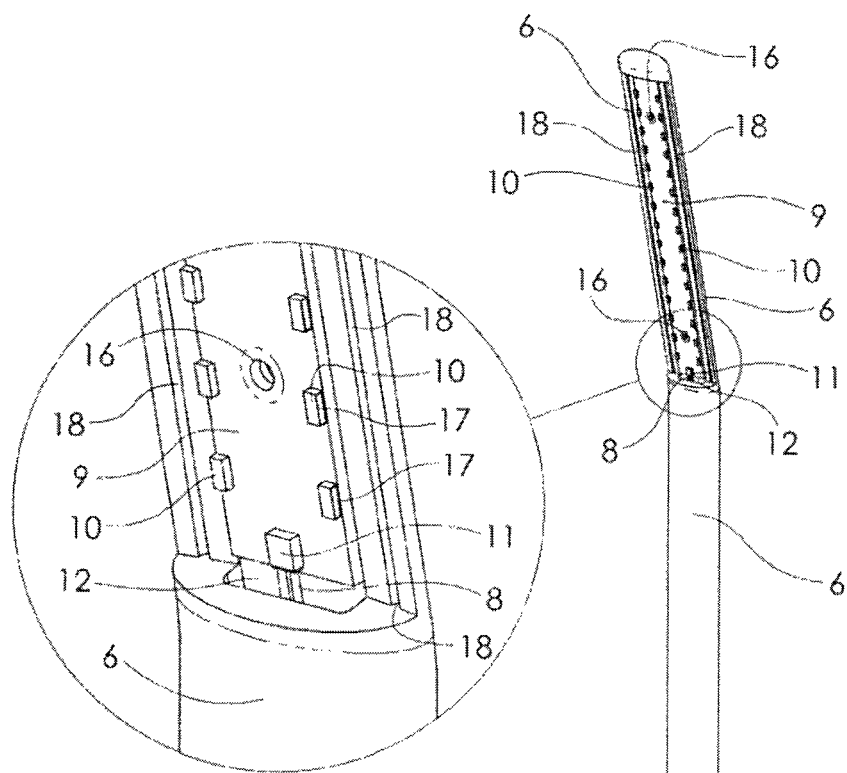
FIG. 9 is an enlarged fragmentary view of FIG. 8 showing details of the LEDs and PCB within the assembly, notably the light emitting surfaces of the LED, in addition to the channel retaining the power source, and grooves to retain the waveguide.
Figures 10, 11:
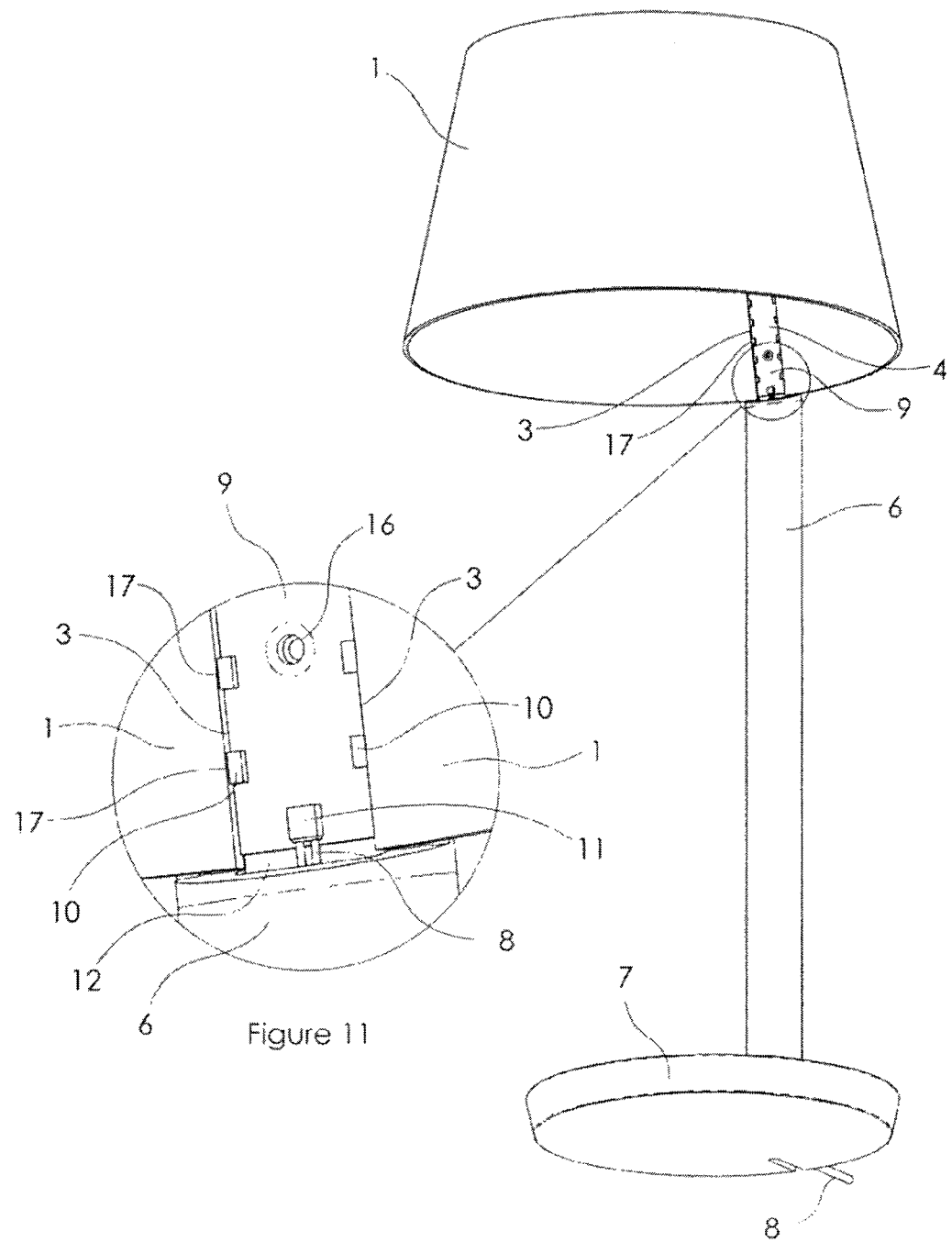
FIG. 10 is a perspective view of the assembly without the mounting plate or hardware, revealing the waveguide in assembly position with the LEDs between the slot in the waveguide, the emitting surfaces of the LEDs facing toward the edges of the waveguide at opposing ends of the slot.
FIG. 11 is an enlarged fragmentary view of FIG. 10 showing details of the LEDs and PCB within the assembly, notably the light emitting surfaces of the LED facing toward and proximal to the edges of the waveguide at opposing ends of the slot.

FIG. 9 is an enlarged fragmentary view of FIG. 8, showing similar details of the assembly as depicted in FIG. 8, and showing in finer detail LEDs 10 that each possess an emitting surface 17 that faces perpendicular to the PCB 9; said emitting surfaces face in the direction of and are proximal to edges 3 of waveguide 1, and captive between slot 4 of said waveguide 1 when the assembly of the waveguide 1 is made to the support frame 6, as seen in FIGS. 10 and 11

FIG. 10 is a perspective view of the invention, with the mounting bracket 15 and hardware 14 removed so a clear view of the PCB 9 and LEDs 10 can be seen within slot 4 of the waveguide 1 as they are assembled to the support frame 6.

FIG. 11 is an enlarged fragmentary view of FIG. 10, showing similar details of the assembly as depicted in FIG. 10, and showing in finer detail LEDs 10 that each possess an emitting surface 17 that faces perpendicular to the PCB 9; said emitting surfaces face in the direction of and are proximal to edges 3 of waveguide 1, and captive between slot 4 of said waveguide 1 when the assembly of the waveguide 1 is made to the support frame 6. When the LEDs 10 are powered, light emits from emitting surfaces 17 in the direction of edges 3 of waveguide 1, through said edges 3 and throughout said waveguide 1, where perturbations (not shown) on a surface 2 of the waveguide 1 extract the light into the surrounding environment.

The invention claimed is:

1. A lighting fixture, comprising:
    a curved waveguide (1) with abutting wave guide edges (3) in spaced relation forming a slot (4) to permit light from an LED light source to travel into the curved waveguide (1); and
    perturbations on the curved waveguide (1) permit light to extract from the curved waveguide (1) into the surrounding environment.

2. The lighting fixture of claim 1, wherein the perturbations are on a major exterior surface (2) of the curved waveguide (1).

3. The lighting fixture of claim 1, in combination with an LED light source (10) is positioned in the slot (4).

4. The lighting fixture of claim 3, wherein a support (6) is provided to support the LED light source (10) and the curved waveguide (1) in an operative position with light from the LED light source (10) travelling into the curved waveguide (1).

5. The lighting fixture of claim 4, wherein a power source (8) extends through a channel (12) in the support (6) to provide power to LED light source (10).

6. The lighting fixture of claim 5, wherein conductors (11) are provided to complete an electrical connection of the curved waveguide (1) with the power source (8).

7. The lighting fixture of claim 4, wherein grooves (18) in the support (6) engage assembly beads (5) along the wave guide edges (3) of the curved waveguide (1).

8. The lighting fixture of claim 4, wherein the LED light source (10) and the curved waveguide (1) are secured to the support (6) by a mounting bracket (15) secured by fasteners (13, 14) which extend into holes (16) in the support (6).

* * * * *